UNITED STATES PATENT OFFICE.

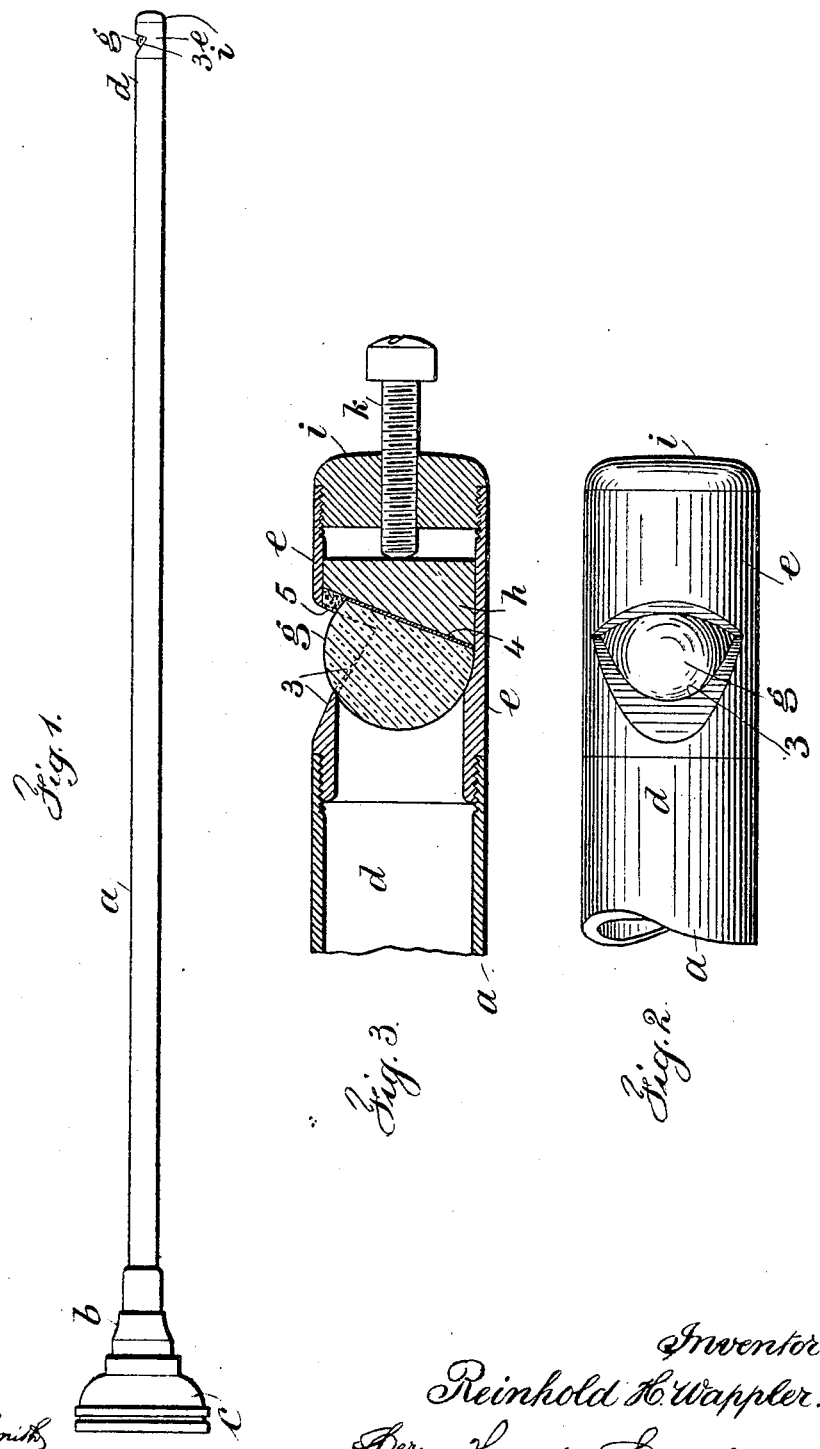

REINHOLD H. WAPPLER, OF NEW YORK, N. Y.

ENDOSCOPE AND OTHER OPTICAL INSTRUMENT.

No. 795,567.  Specification of Letters Patent.  Patented July 25, 1905.

Application filed June 24, 1904. Serial No. 213,913.

*To all whom it may concern:*

Be it known that I, REINHOLD H. WAPPLER, a citizen of the United States, residing in the borough of Manhattan, in the city, county, and State of New York, have invented an Improvement in Endoscopes and other Optical Instruments, of which the following is a specification.

My invention relates to an improvement in endoscopes and other optical instruments, particularly adapted for use in connection with electrosurgical instruments employed in the examination for and detection of diseases of a gastric or urinary nature, and the same is an improvement upon the device shown and described in Letters Patent granted to me March 24, 1903, No. 723,790, with the twofold object of increasing the extent of vision and of facilitating setting and holding the hemispherical lens in place.

In my present as in my prior invention I employ a suitable telescopic tube fitted with the necessary lenses to magnify and carry the image, the telescopic tube having a suitable end eyepiece and being provided at the opposite end with a removable end piece. In this end piece is mounted a plano-convex lens, whose convex surface is more than hemispherical, set at an angle of about seventy degrees with the axial line of the telescopic tube, the flat back of the lens being silvered or suitably coated to obtain the necessary reflecting property. This lens is cemented to a cylindrical section-block inserted in the bored-out end piece. This end piece is interiorly threaded at its free end for an end plug, through which passes a set-screw, at its inner end bearing against the section-block to force the same to its seat in suitable cement to form a water-tight joint. This set-screw is afterward cut off where it projects beyond the end plug.

In the drawings, Figure 1 is an elevation of my improved optical instrument. Fig. 2 is a plan, in larger size, of the end piece and a part of the tube at one end and at right angles to Fig. 1; and Fig. 3 is a longitudinal section centrally of the parts shown in Fig. 2.

*a* represents the telescopic tube; *b*, a head-piece, and *c* an eyepiece thereto at one end, which so far generally correspond to similar parts shown in my aforesaid patent, this tube being, as usual, provided with suitable lenses to magnify and carry the image. The free open end *d* of the telescopic tube is interiorly threaded to receive the tubular metallic end piece *e*. One end of this end piece is slightly reduced and exteriorly threaded to screw into the interiorly-threaded end *d* of the tube *a*, and in this end of the end piece I may, if desired, place an ordinary double convex lens advantageously cemented in a seat prepared therefor. The opposite end of the end piece is also bored out and provided with an aperture 3 of triangular outline.

The plano-convex lens *g*, a portion of which appears in the opening or aperture 3 of the tube and which in my former patent is hemispherical, is in the present case a lens whose convex surface is more than hemispherical.

*h* is a cylindrical section-block having its advancing surface at an angle of about seventy degrees to the horizontal and its back surface transverse to the end piece *e* and at right angles to the axis of the tube *a* and end *e*. The lens *g* is to be suitably silvered at its back 4 and cemented to the inclined surface of the section-block *h*, and when the section-block and lens are pushed into the end piece *e* said lens is to be held in place by cement 5 at the places shown and around the edges of the opening 3, so as to form a water-tight joint.

The free or right hand end of the end piece is interiorly threaded to receive a shouldered end plug *i*, and passing centrally through this end plug is a set-screw *k*, which after the end plug has been screwed down to place is rotated and pressed against the back of the section-block *h* to force the same, with the lens *g*, forward tightly and snugly to its seat at all the possible points of contact. After this has been accomplised the set-screw *k* is cut off at the exposed surface of the end plug *i* and is riveted or smoothed down to place, so that the joint is closed and substantially liquid tight, because after the lens is once seated and the parts firmly connected with sealed joints there is no after occasion to disturb the parts except for breakage.

By the employment of a lens whose convex surface is more than hemispherical and by slightly increasing the area of the aperture 3 a greater range of vision is obtained for the use of this instrument, it being possible to look backward to a far greater extent than was possible in the device of my former patent, with the lens therein set at an angle of forty-five degrees.

The instrument as hereinbefore described is particularly adapted to be used either in connection with the electrosurgical instrument shown and described in my aforesaid Letters Patent or with the electrosurgical instrument shown and described in Letters Patent granted to me June 17, 1902, No. 702,752, in which an electric lamp is fitted and is available to illumine any cavity of the body into which the endoscope is inserted. This lens has a range of vision by its divergent angles of incidence in excess of the hemispherical lens of my aforesaid patent, the divergence being only controlled by the inclined walls of the aperture 3 in the end piece and it being possible to see plainly objects between and in line with the lens and the head-piece $b$.

I claim as my invention—

1. In an optical instrument, the combination with a tube having an opening therein, of a plano-convex lens whose convex surface is more than hemispherical set in said tube adjacent to the opening therein and in such a position that the angle between the flat face or back of the lens and the axial line of said tube is an angle of about seventy degrees, a support for the said lens in the form of a cylindrical section-block, and means for closing the end of the tube and holding the lens and block firmly in place.

2. In an optical instrument, the combination with a tube having an opening therein, of a plano-convex lens set in said tube adjacent to the opening therein and in such a position that the angle between the flat face or back of the lens and the axial line of said tube is an angle of about seventy degrees, a cylindrical section-block serving as a support for the said lens to which the same is cemented, an end plug connected to said tube back of said block, and a set-screw or equivalent device passing centrally through the end plug and bearing at its advancing end against the back of the section-plug to force the same to place and the lens to its seat.

3. The combination with a telescopic tube and the lens thereof, of a metal end piece having an opening therein and being adapted to be removably connected to said telescopic tube, a plano-convex lens set in said metal end piece filling the opening, a backing on the flat face or back of said lens, a support for the lens, and means for securely holding the lens in place to its seat.

4. The combination with a telescopic tube and the lens thereof, of a metal end piece having an opening therein and being adapted to be removably connected to said telescopic tube, a plano-convex lens whose convex surface is more than hemispherical set in said metal end piece filling the opening, a backing on the flat face or back of said lens, a support for the lens, and means operative after the assembling of the parts to force the lens to its seat so as to form a liquid-tight joint with the parts of the end piece and to hold its base or support in position.

5. The combination with a telescopic tube, of a metal end piece having an opening therein and adapted to be connected to said telescopic tube, the free end of said metal end piece being bored out to form a seat, a cylindrical section-block adapted to pass into said bored-out end, an end plug adapted to screw into said end, a set-screw passing centrally through the end plug with its advancing end adapted to bear against the back of the section-block, and a plano-convex lens whose convex surface is more than hemispherical secured to the surface of said section-block by its flat back or face at an angle of about seventy degrees and forced to place by said set-screw.

6. In an optical instrument, the combination with a tube having an opening therein, of a plano-convex lens whose convex surface is more than hemispherical set in said tube adjacent to the opening therein and in such a position that the angle between the flat face or back of the lens and the axial line of the tube is an angle of about seventy degrees, a support for the said lens, and means operative after the assembling of the parts to force the lens to its seat so as to form a liquid-tight joint with the parts of the end piece and to hold its base or support in position.

7. In an optical instrument, the combination with a tube having an opening therein, of a plano-convex lens whose convex surface is more than hemispherical set in said tube adjacent to the opening therein and in such a position that the angle between the flat face or back of the lens and the axial line of the tube is an angle of about seventy degrees, a support for the said lens, a closure for the tube back of the said support, and a coacting manually-actuated device for forcing the lens and its support forward to a seat.

Signed by me this 17th day of June, 1904.

REINHOLD H. WAPPLER.

Witnesses:
  GEO. T. PINCKNEY,
  S. F. HAVILAND.